United States Patent Office 3,381,170
Patented Apr. 30, 1968

3,381,170
CIRCUIT FOR SWITCHING HIGH BEAM HEADLAMPS TO LOW BEAM HEADLAMPS DURING SHORT CIRCUIT CONDITIONS
Albert Franz, Nurtingen, Wurttemberg, Germany, assignor to Hermann Stribel oHG, Nurtingen, Wurttemberg, Germany
Filed July 6, 1966, Ser. No. 563,267
12 Claims. (Cl. 315—83)

ABSTRACT OF THE DISCLOSURE

An arrangement for controlling the lights for night driving of motor vehicles. For safe driving of motor vehicles, two sets of lights are provided. One set of lights is designated for long-range vision and is of very bright intensity. The other set of lights is dimmed and is intended for limited visual range when two motor vehicles pass each other. The dimmed lights assure that the drivers of the motor vehicles will not be disturbed from the effects of glaring headlamps. An electromechanical arrangement including impulse relays and circuit breakers assures that automatic switching to the dimmed lights takes place when external short-circuits develop in the lighting system, which would ordinarily prevent switching from the bright lamps to the dimmed lamps.

---

The present invention relates to a lighting means for controlling the lighting of lamps in a motor vehicle.

The conventional motor vehicle is provided with short-range and long-range lamps for purposes of driving at night. In the normal course of driving, one or the other of these lamps will be switched on depending on the particular circumstances. These lamps are operated, generally, from a storage battery carried by the vehicle and which serves as the source of energy for the ignition as well as various appliances situated within the vehicle. To protect the electrical system from the battery, a link is located within the system to prevent current flow from the battery in the event any short-circuits occur external to the battery and the lamps. When, heretofore, this fuse link would open as a result of such short-circuits, it would be impossible to dim the headlights of the vehicle. Since maintaining the bright lights against oncoming cars is a dangerous condition, it is desirable to provide an arrangement whereby the head lights are automatically dimmed upon opening of the fuse.

Accordingly, it is an object of the present invention to provide an arrangement whereby an automatic transfer takes place from the bright lights to the dimmed lights in a motor vehicle, when the fuse protecting the electrical battery circuit opens.

Another object of the present invention is to provide an arrangement, as set forth, which applies electromechanical elements to the control of the headlights.

A further object of the present invention is to provide an arrangement, as set forth, which is compact and contained in an enclosure readily installable in motor vehicles.

A still further obpect of the present invention is to provide an arrangement, as set forth, which operates reliably with relatively low maintenance.

A yet further object of the present invention is to provide an arrangement, as set forth, whereby the driver of the motor vehicle becomes informed of the opening of the fuse.

With these objects in view, the invention includes short-range and long-range lamps, a source of electric energy to operate the lamps, an impulse relay movable between a first and a second state and connecting the source of energy with the long-range lamps in the first state and with the short-range lamps in the second state thereof, means for actuating the impulse relay, a circuit breaker means actuated by a predetermined current flow and connected, on one hand, to the energy source and, on the other hand, to the impulse relay when the actuating means is actuated, a safety relay actuated upon actuation of the circuit breaker and transferring automatically connection from the energy source to the short-range lamps when the energy source is connected to the long-range lamps, and a switching means connected in series with the impulse relay and the energy source for controlling the lighting of the lamps.

The novel features which are considered as characteristic for the invention are set forth in particular in the appended claims. The invention itself, however, both as to its construction and its method of operation, together with additional objects and advantages thereof, will be best understood from the following description of two specific embodiments when read in connection with the accompanying drawings in which:

Figure 1:
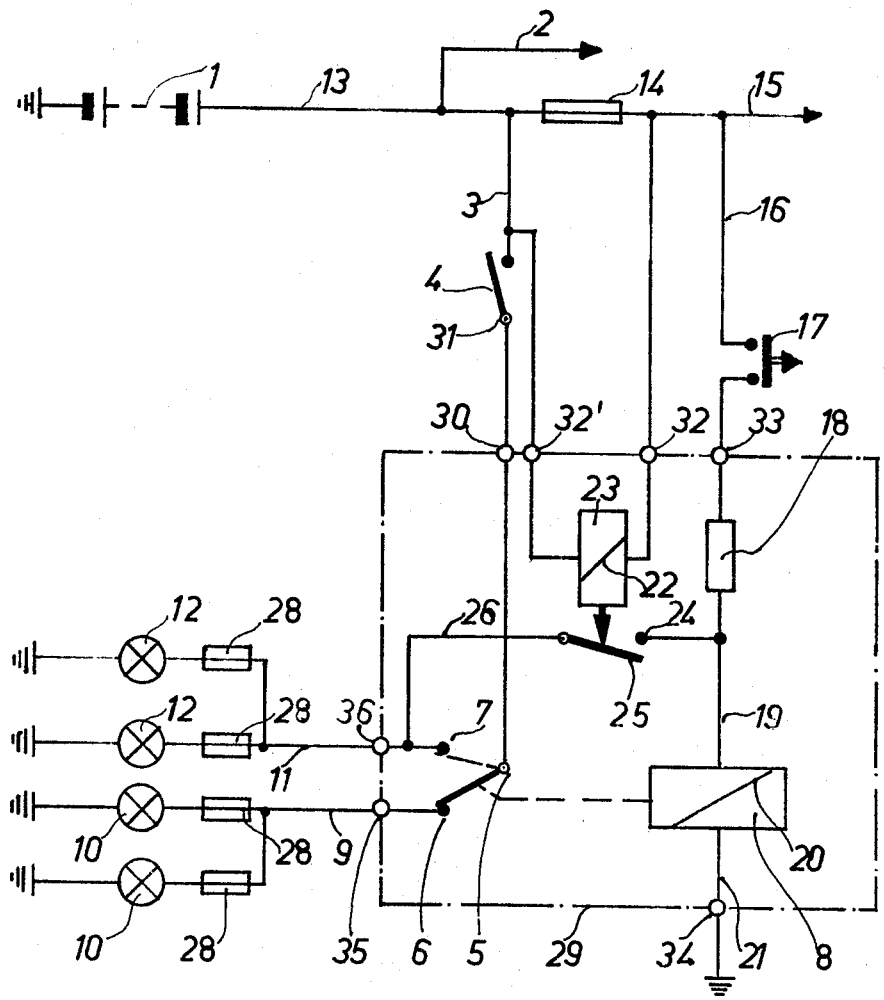
FIGURE 1 is an electrical schematic diagram and shows the operational elements of the lighting arrangement.

Referring to the drawing, the arrangement is energized from a battery 1. A conducting path 3 including the light switch 4 is connected to the battery through path 13. The switch 4 is connected to the contact 5 of an impulse relay 8. An impulse relay is one which has two states, and which transfers, from whatever state it is in, to the opposite state whenever an impulse is applied to its coil. The contact 6 of the switching pole of the relay 8, is connected to the short-range lamps 10. The contact 7, an the other hand, leads to the lamps 12, via the conducting path 11.

Conducting path 13 leading from the battery connects to path 3 associated with a control circuit. Path 13 also leads to one terminal of a fuse link or circuit breaker 14. The other terminal of the fuse link is connected to conducting paths 15 and 16. Path 16 includes a push button or momentary contact switch 17 which is connected to one terminal of a resistor 18. The other terminal of the resistor 18 is connected to the coil 20 of a relay 8 by way of the path 19. The other side 21 of coil 20 is connected to ground potential at connection 34.

Figure 2:
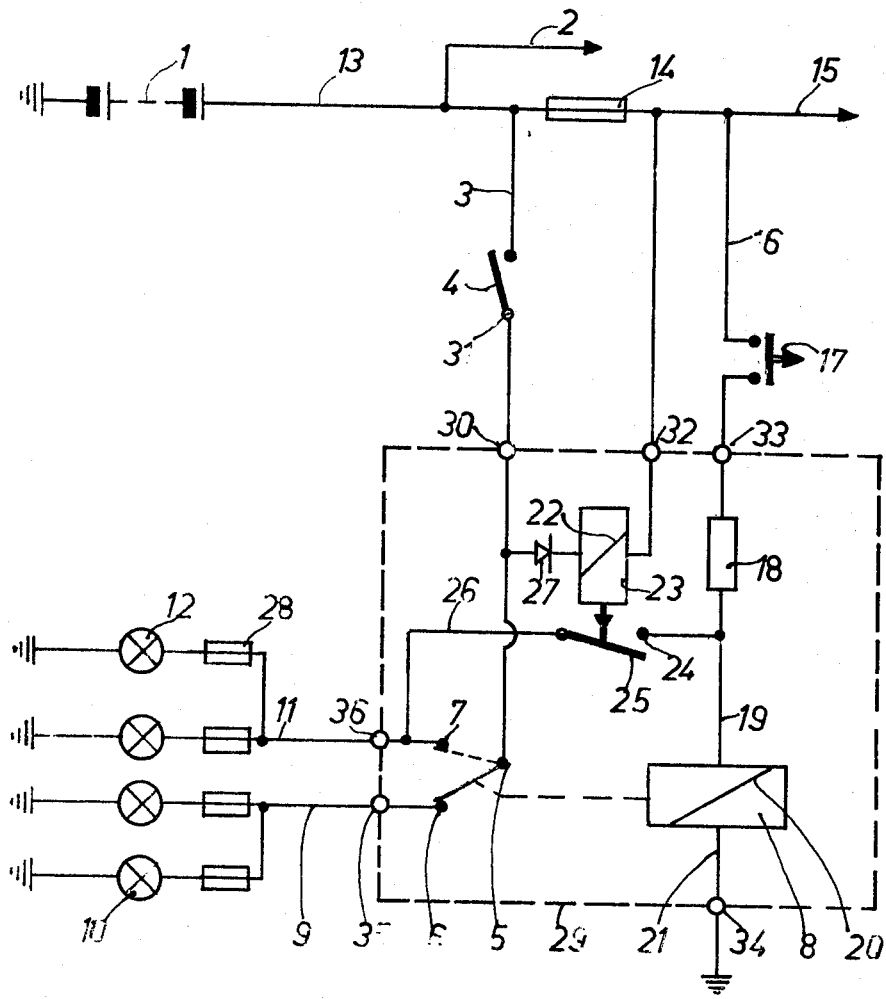
FIGURE 2 is an electrical schematic diagram of another embodiment of the lighting arrangement of FIGURE 1.

A high-resistance coil 22 of a relay 23 is connected in parallel with the circuit breaker 14. The switching contact 24 is connected to path 19 which joins resistor 18 with the coil of relay 8. The movable switching contact 25 is connected to the long-range lamps 12 via path 26 and path 11. In the embodiment of FIGURE 1 a first terminal of the relay coil 22 is connected to the path 3 between the battery and the switch 4, while the other terminal of the relay coil is connected to the path 16 between fuse link 14 and switch 17. With this arrangement the relay coil 22 is connected directly across the fuse link 14. In the embodiment of FIGURE 2 the first terminal of the relay coil 22 is connected to the contact 5 by way of a diode 27. The other terminal of the relay coil 22 is connected in the same manner as the corresponding terminal of the embodiment of FIGURE 1.

The arrangement operates in the following manner:
When driving at night under normal conditions, the switch 4 is closed, and as a result, current flows from the battery 1 to the short-range lamps 10 via the series circuit composed of path 13, path 3, switch 4, contacts 5 and 6, path 9, and fuse links 28. In the event that the long-range lamps 12 are to be used in lieu of the short-range lamps 10, it is necessary to actuate the momentary contact switch 17. Such actuation of the switch 17 closes the circuit of the battery 1 to the coil 20 of impulse relay 8. This circuit is traced from the battery by path 13, fuse link 14, path 16, switch 17, resistor 18, and path 19. The momentary closure of the circuit through the switch 17 produces a pulse which causes the impulse relay 8 to transfer to the opposite state from that in which it is situated. Accordingly, the movable switching contact 5 transfers from the position in which it connects with contact 6, to the position (shown by dotted lines) in which it connects with contact 7. In this state of the circuit, power is applied to the lamps 12 as a result of the series circuit of battery 1, path 13, path 3, switch 4, contacts 5 and 7, path 11, and fuse links 28.

When the momentary contact switch 17 is released, the coil 20 of relay 8 becomes de-energized as a result of the opening of the circuit leading to the battery. The movable contact 5, however, remains connected to the contact 7 due to the inherent design of an impulse relay. The conventional relay includes, in its actuating mechanism, a pawl and ratchet combination. Whenever the coil of the relay is energized, the pawl becomes actuated due to solenoid effects, and as a result the pawl engages the ratchet wheel and turns the latter by a designated amount. This turning of the ratchet wheel causes a transfer of the relay switching contacts to the opposite state. When the relay coil is subsequently de-energized, the pawl returns to its initial position. However, in its return stroke, the pawl glides over the ratchet wheel in the customary manner without imparting to the latter any motion. The relay thus maintains the state to which it transferred when its coil was energized, upon removal of power from the coil. Accordingly, if it is desired to retransfer operation from lamps 12 to lamps 10, it is necessary to actuate switch 17 again so that relay 8 will effect the required exchange of contacts.

If, now, the circuit through the fuse link 14 is opened due to, for example, a short circuit developed in the apparatus connected to path 15, the relay 23 becomes operated. This situation occurs because, without a closed path through the fuse link 14, a substantial voltage appears across terminals 32 and 32', and this voltage drop functions to actuate the relay 23. The fuse link 14 is a low-resistance element, and therefore no substantial voltage drop can prevail across it provided it is intact. Through proper selection of the relay coil 22, the relay 23 may be prevented from operating when such a relatively low voltage drop appears across the terminals of its coil. Therefore, although current is continuously passing through the coil 22, the relap does not operate until a sufficiently large current circulates through its coil, and this condition prevails only when the fuse link 14 is open. Since such opening of a fuse generally occurs as a result of a heavy current through it due to short-circuit loading, such short circuit may, for example, be attributed to the apparatus which draws power from the battery 1 by way of path 15. When the battery 1 is situated in a motor vehicle, it is understandably drawn upon for purposes in addition to powering the lamps 10 and 12. Additional apparatus in the form of other lamps, ignition system, radio, etc., are thus connected to the paths 2 and 15.

When the fuse link 14 opens and interrupts the circuit, it is not possible to actuate the relay 8 by depressing the switch 17. Accordingly the circuit remains frozen in the state whereby the long-range lamps 12 are in use. However, as a result of the actuation of relay 23, current is able to flow to the coil 20 of relay 8, by way of the series circuit composed of the path 13, path 3, switch 4, contacts 5 and 7, path 26, contacts 25 and 24, and path 19. With the circuit to relay 8 thus established, the latter becomes actuated and transfers to the opposite state in which contact 5 connects with contact 6. This transfer of the relay 8, consequently, has the effect of returning operation from the long-range lamps 12 to the short-range lamps 10.

The resistor 18 is inserted into the circuit to prevent heavy current flow to the short-circuited load upon depression of the switch 17. In the absence of resistor 18, such current flow would take place through path 13, path 3, switch 4, contacts 5 and 7, path 26, contacts 25 and 24, and switch 17. A low-resistance path in this direction is undesirable because it prevents an adequate amount of current from flowing to the coil 20 of relay 8. Therefore, if switch 17 were simultaneously depressed with the opening of the fuse link 14 and consequent operation of relay 23, relay 8 could not become actuated. The resistor 18 serves to increase the resistance of the path towards switch 17, and therefore the main current flow is directed toward coil 20 for proper operation of the relay 8.

If, in the event, the fuse link 14 opens, while driving in the day time, due to a short circuit in the path 15, this condition will generally not be observed until the evening when it is desired to turn on the lights by closing switch 4. As a result the relay 23 may be energized throughout the period of time that the condition remains unnoticed. The opening of the fuse link becomes, in fact, apparent, when one is unable to transfer operation from lamps 10 to lamps 12 by actuating the switch 17. The condition of having relay 23 energized over an extended period of time is undesirable because it acts as a drain on the battery 1 and decreases the life of the relay.

The embodiment of FIGURE 2 avoids the problems associated with the unnoticed condition that the fuse link 14 is open. This embodiment includes a diode 27 in series with the coil 22 of the relay 23. When the fuse link 14 opens during the day time, the coil 22 remains unenergized because the light switch 4 remains open. Only when driving in the evening with the switch 4 closed, does the condition of the fuse become apparent upon actuation of the switch 17. The relay 23, therefore, does not remain in the operated state for an extended period of time, because it may be assumed, that soon after the switch 4 is closed for night driving, it becomes desired to actuate the switch 17.

With the diode connected so that it conducts current only in the direction shown in FIGURE 2, there can be no current flow to the lamps by way of the relay coil 22 when the fuse link is intact. Thus, in the absence of diode 27, and under normal conditions in which the path through the fuse link 14 is closed, current could flow to the lamps by way of the path 13, fuse link 14, terminal 32, relay coil 22, and contact 5. With the diode in the circuit, however, current flow in this direction is inhibited. Such current flow is undesirable because it bypasses the switch 4, and would light either lamps 10 or 12 at all times including day time. Aside from these features associated with the diode 27, the operation of the embodiment of FIGURE 2 is the same as the embodiment of FIGURE 1.

The operating elements of the control circuit may all be contained within a single enclosure 29. The enclosure may be provided with suitable terminals for connecting to the various elements within the enclosure. Thus, terminal 30 connects to contact 5, terminals 32' and 32 connect to the relay coil 22, terminal 33 connects to the resistor 18, terminal 34 grounds the coil 20 of relay 8, and terminals 35 and 36 connect to contacts 6 and 7 respectively. The enclosure or unit 29, therefore, can be readily installed and adapted to any vehicle.

Without further analysis, the foregoing will so fully reveal the gist of the present invention that other can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of the equivalence of the following claims.

What is claimed as new and desired to be secured by Letters Patent is:

1. A lighting means comprising, in combination, at least one first lamp and at least one second lamp; a source of electric energy to operate said lamps; an impulse relay movable between a first and a second state and connecting said source of energy with said first lamp in said first state, and with said second lamp in said second state thereof; means for actuating said impulse relay; a circuit breaker means actuated by a predetermined current flow and connected on one hand, to said energy source and, on the other hand, to said impulse relay when said actuating means is actuated; a safety relay actuated upon actuation of said circuit breaker and transferring automatically connection from said source of energy to said second lamp when said energy source is connected to said first lamp; and a switching means connected in series with said impulse relay and said source of energy for controlling the lighting of said lamps.

2. The lighting means according to claim 1 wherein said impulse relay comprises: a coil connected, on one hand, to the source energy and, on the other hand, to said means for actuating said impulse relay; and a switching contact movable between a first and second contact associated with said impulse relay, said first contact being connected to said first lamp and being associated with said first state of said impulse relay, and said second contact being connected to said second lamp and being associated with said second state of said impulse relay.

3. A lighting means according to claim 2 wherein said safety relay comprises: a coil connected in parallel with said circuit breaker means; and a safety switching contact movable between a circuit closure contact and an open circuit position, said safety switching contact being connected to said first contact of said impulse relay and said circuit closure contact being connected to the coil of said impulse relay and to the means for actuating said impulse relay.

4. The lighting means according to claim 2 wherein said impulse relay includes means whereby said impulse relay transfers from the state it occupies to the opposite state when a step input signal is applied to its coil, and maintains this opposite state for as long as the level of the step input prevails, said impulse relay returning to its original state only upon application of an additional step input signal.

5. The lighting system according to claim 2 wherein said switching means comprises a switching arm movable between a lamp-lighting contact and a lamp-out position, said switching arm being connected to said switching contact of said impulse relay, and said lamp-lighting contact being connected to said source of energy, said lamps being disconnected from said source of energy when said switching arm is in the lamp-out position.

6. The lighting means according to claim 2 including a resistor interposed between the coil of said impulse relay and said means for actuating said impulse relay.

7. The lighting means according to claim 1 wherein said means for actuating said impulse relay comprises a momentary contact switch movable between a circuit closure state and a circuit open state, said momentary contact switch having depression means for holding latter depressed in the circuit closure state whereby a step-input signal is applied to the coil of said impulse relay, said momentary contact switch being in the circuit open state when said depression means is not held depressed.

8. The lighting means according to claim 3 wherein said circuit breaker means comprises an electrical fuse link of relatively low ohmic resistance; said coil of said safety relay comprises a winding of relatively high resistance in comparison to the resistance of said fuse, and said source of electrical energy comprises a storage battery.

9. The lighting system according to claim 3, including a diode connected in series with the coil of said safety relay, said switching means being interposed between said diode and said circuit breaker means.

10. The lighting system according to claim 6 wherein a diode is connected, on one hand, to the coil of said safety relay and, on the other hand, to said switching means, said diode being directed so as to allow current flow from said switching means to the coil of said safety relay and to inhibit current flow in such reverse direction.

11. The lighting means according to claim 1 including an enclosure with electrical terminals, said enclosure enclosing said impulse relay and safety relay, said terminals providing access to said relays within said enclosure.

12. The lighting means according to claim 10 including an enclosure with electrical terminals, said enclosure enclosing said impulse relay, safety relay, resistor and diode, said terminals providing access to said relays, resistor and diode within said enclosure.

References Cited
UNITED STATES PATENTS

| | | | |
|---|---|---|---|
| 2,447,736 | 8/1948 | Cheshier | 315—83 |
| 2,476,382 | 7/1949 | Pillus | 315—83 |
| 2,540,410 | 2/1951 | Wagner | 315—83 |
| 3,139,555 | 6/1964 | Paule et al. | 315—83 X |

JAMES W. LAWRENCE, *Primary Examiner.*

C. R. CAMPBELL, *Assistant Examiner.*